United States Patent [19]

Grove, Jr.

[11] Patent Number: 4,549,751
[45] Date of Patent: Oct. 29, 1985

[54] UNIVERSAL SUPPORT FOR METERS

[76] Inventor: Leslie W. Grove, Jr., 409 Biggs Ave., Frederick, Md. 21701

[21] Appl. No.: 576,880

[22] Filed: Feb. 3, 1984

[51] Int. Cl.$^4$ ............................................. F16L 35/00
[52] U.S. Cl. ...................................... 285/30; 285/61; 285/404
[58] Field of Search .................... 285/30, 31, 61, 64, 285/404

[56] References Cited

U.S. PATENT DOCUMENTS

| | | | |
|---|---|---|---|
| 1,142,667 | 6/1915 | Calhoun | 285/30 |
| 1,282,624 | 10/1918 | Bartholomay | 285/30 |
| 1,801,377 | 4/1931 | Sutliff | 285/30 X |
| 2,564,428 | 8/1951 | Ford et al. | 285/30 X |
| 3,511,524 | 5/1970 | Ford et al. | 285/30 |

FOREIGN PATENT DOCUMENTS 991719  5/1965  United Kingdom ................ 285/404

Primary Examiner—Dave W. Arola
Attorney, Agent, or Firm—Walter G. Finch

[57] ABSTRACT

The invention is an improved support for meters, in particular for water meters. The invention can be used as a universal application because it is adjustable. Meter supports of the prior art are usually of a common yoke type and each meter configuration requires a meter support of its own because of its variation in dimensions. The present adjustable feature is easily adaptable to any size or configuration of meters. The universal and adjustable meter support consists of two adapters to fit the inlet and outlet ports of the meter being installed, two end members, and a spacer member. The spacer member is easily fabricated from commonly available stock. The simple assembly of the five simple components to the meter to be supported indicates its adjustability and universal application.

9 Claims, 4 Drawing Figures

UNIVERSAL SUPPORT FOR METERS

BACKGROUND AND SUMMARY OF THE INVENTION

The invention relates to metering devices and in particular to water meters. Specifically, it relates to the support of meters, particularly water meters, and provides an adjustable means of making that support structure of universal application.

In the prior art supports for meters, particularly water meters, resorted to a yoke type support. The difficulty was that a change in the dimensional configuration of water meters, as between various manufacturers or even by one manufacturer, required a new support means, usually of the yoke type.

For example one manufacturer of the prior art support means pointed out that their yoke type supports were made in "three general types", straight line yoke, angle yoke, and riser yoke. However, if the meter configuration of another manufacturer did not fit the yokes, again another shape or size of yoke would be required. Furthermore the prior art supports required costly expansion fittings and gaskets, which deteriorate in service. The present invention eliminates the need for gaskets and expansion fittings.

The present invention overcomes these problems. The present invention is composed of five simple components: two adapters, one to fit the inlet of the meter and one to fit the outlet of the meter; two end members which slip over the two adapters, and a spacer member.

The spacer member can be cut from a commonly available pipe stock. In the simple assembly: the adapters are threadably assembled to the meter inlet and outlet, respectively; the two end members are slipped over the two adapters, one end member over each adapter; and the spacer member is inserted through an aperture in each of the two end members and fastened to the end members by suitable set screws of the two end members.

Thus assembled, the meter can be set in place by various methods of the prior art, and connected into the line for which the meter will measure the volume of the flow passing through it. It could be connected, for example, in any of the three methods noted hereinbefore: straight line; angle; or riser.

The structure of the end members is such that they can accommodate to whatever type of location where the meter is to be placed, such as resting on a slab, perched on a rock or wall bracket, set on posts of various types, or any other type arrangement.

It is, therefore, an object of this invention to provide a support for meters that is adjustable.

It is also an object of this invention to provide a support for meters that has a universal application.

It is another object of this invention to provide a support for meters that can be assembled very simply to a meter.

It is still another object of this invention to provide a support for meters that consists of only five simple components.

Further objects and advantages of the invention will become more apparent in light of the following description of the preferred embodiments.

DESCRIPTION OF THE PREFERRED EMBODIMENTS

Figure 1:
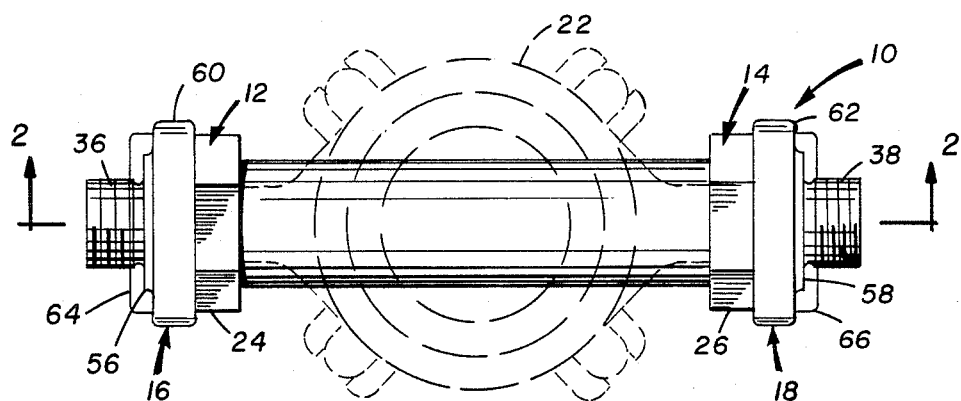
FIG. 1 is a plan view of a universal support for meters.
Figure 2:
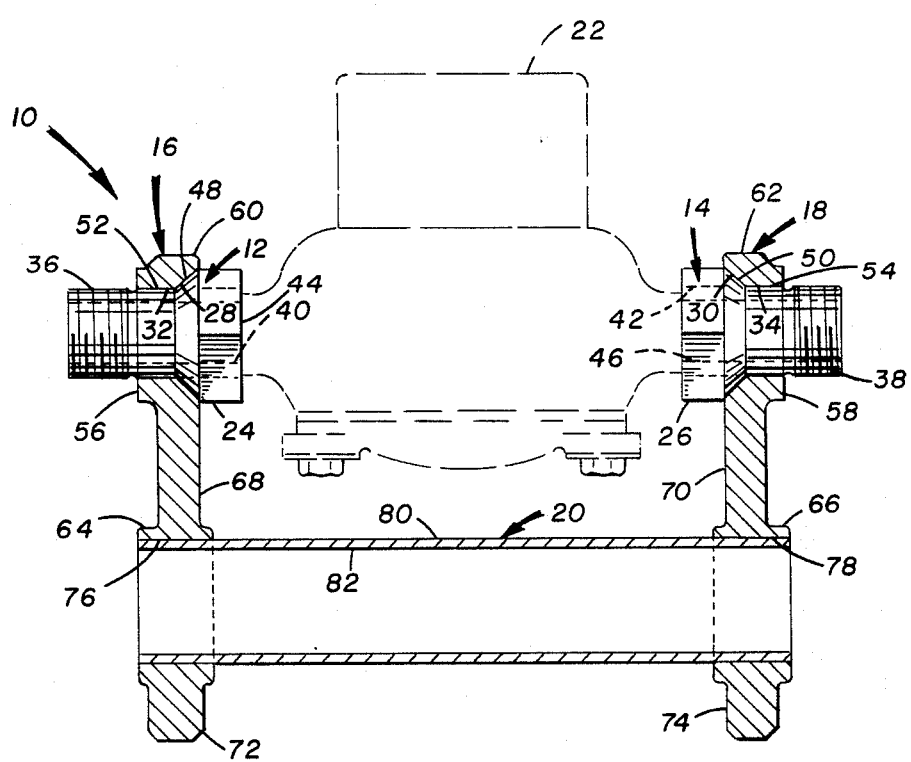
FIG. 2 is cross sectional view on line 2—2 of FIG. 1.
Figure 3:
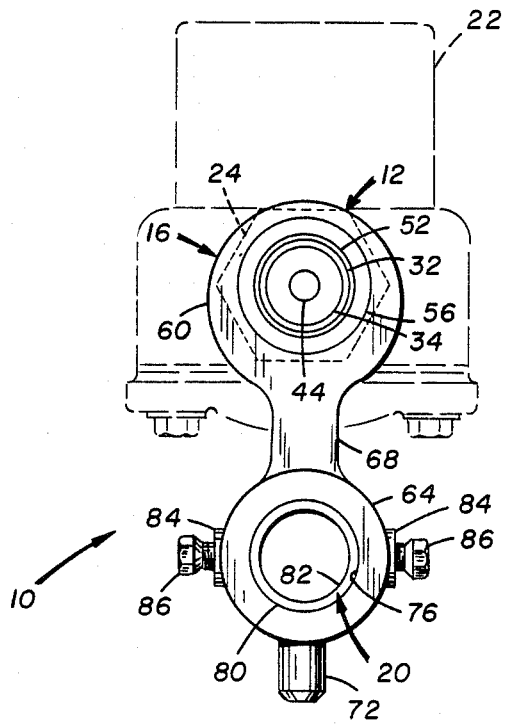
FIG. 3 is an end view of FIG. 1.

Referring now to the drawings and particularly to FIGS. 1, 2 and 3, a universal support for meters is shown at 10. FIG. 1 shows a plan view, FIG. 2 shows a longitudinal cross sectional view, and FIG. 3 shows an end view of the universal support for meters 10.

The universal support for meters 10 consists of five major components. The five major components are: an adapter means 12 for the meter inlet; an adapter means 14 for the meter outlet; an end member 16 on the inlet side; an end member 18 on the outlet side; and a spacer member 20. The elements of these five components is described hereinafter.

In view of the fact that the inlet and outlet of a meter 22 (shown in phantom lines in FIGS. 1, 2 and 3) are usually the same size, adapter means 12 and 14 are exactly the same. It is to be understood, however, that adapter means 12 and 14 could vary in regards to the size of the threaded portions, described hereinafter, if any one or more of the meter 22 inlet and meter 22 outlet, or the supply line on the inlet side or the distribution line on the outlet side varied in size. Such variations are within the scope and intent of this invention.

In a like manner, in view of the fact that the inlet and outlet adapter means 12 and 14 are usually the same size, end members 16 and 18 are the same size. It is to be understood, however, that both the adapter means 12 and 14 and the end members 16 and 18 may be provided in a range of sizes if present or future meter 22 sizes or configurations require such a range of sizes. Such a variation is within the scope and intent of this invention.

The spacer means 20 is shown in FIG. 2 as extending through and between end members 16 and 18, the details of which are described hereinafter. It is to be understood, however, that it is within the scope and intent of this invention for spacer means 20 to extend through and beyond the face of end members 16 and 18 if desired or required for any reason.

The adapter means 12 and 14 each have a hexagonal portion 24 and 26, respectively, on one end. These hexagonal portions 24 and 26 are for a wrench means to tighten it to meter 22 as described hereinafter. It is to be understood that it is within the scope and intent of this invention for the hexagonal portions 24 and 26 to be of any other geometrical configuration and capable of tightening by any regular or special wrench means.

Adjacent to the hexagonal portions 24 and 26 of each adapter means 12 and 14, respectively, have a tapered portion 28 and 30, respectively, which nests and fits into a conical-like recess 48 and 50, respectively, of end members 16 and 18 and described hereinafter.

Adjacent to the tapered portions 28 and 30 of each adapter means 12 and 14, respectively, is a cylindrical portion 32 and 34, respectively. The cylindrical portions 32 and 34 each removably insert into an aperture 52 and 54, respectively, of end members 16 and 18, respectively, as described hereinafter.

An external male threaded portion 36 and 38 of adapter means 12 and 14, respectively, adjacent to the aforementioned cylindrical 32 and 34, respectively, completes the outside configuration of adapter means 12 and 14.

Internally, the adapter means 12 and 14 each have a passageway 44 and 46 therethrough, respectively. Within the hexagonal portions 24 and 26 of adapter means 12 and 14, respectively, each has an internal female threaded counterbore 40 and 42, respectively.

In use, the adapter means 12 is threadably assembled to the inlet side of the meter 22 by use of the internal threads 40 and tightened in place by use of the hexagonal portion 24. In a like manner, the adapter means 14 is threadably assembled to the outlet side of the meter 22 by use of the internal threads 42 and tightened in place by use of the hexagonal portion 26.

When installed, as later described, the interior of the supply line (not shown) communicates with the passageway 44 which communicates, via the threaded counterbore 40, with the normal passageway through the meter. Thereafter the normal passageway through the meter communicates, via the threaded counterbore 42, with the passageway 46, which in turn communicates with the interior of the distribution line (not shown).

After the adapter means 12 and 14 are threadably assembled to the meter 22, as hereinbefore described, the end members 16 and 18 are assembled to the adapter means 12 and 14, respectively, as hereinafter described.

The apertures 52 and 54 of end members 16 and 18, respectively, are round or circular holes in configuration. The round apertures 52 and 54 are slipped over the cylindrical portions 32 and 34 of adapter means 12 and 14, respectively, so that the apertures 52 and 54 slidably and removably encircle the cylindrical portions 32 and 34, respectively. Concurrently, the tapered portions 28 and 30 of the adapter means 12 and 14, respectively, come to rest and nest in the conical-like recesses 48 and 50 of the end members 16 and 18, respectively.

At this point the end members 16 and 18 are just loosely assembled to the adapter means 12 and 14 respectively. The manner of rigidly affixing them in place will be described hereinafter when the description of the elements and configuration of the end members 16 and 18 has been completed.

The end members 16 and 18 each have an upper body portion 60 and 62, respectively, and a lower body portion 64 and 66, respectively. A connecting body portion 68 connects upper body portion 60 to lower body portion 64. In a like manner, a connecting body portion 70 connects upper body portion 62 to lower body portion 66. The structure of end members 16 and 18 is each individually integral and monolithic, however, it is to be understood that it is within the scope and intent of this invention that the end members 16 and 18 may be fabricated.

In addition to the aforementioned elements of component end members 16 and 18, a boss 56 and 58, respectively, encircles the apertures 52 and 54, respectively to give strength to the area and the necessary depth to completely surround and encircle the cylindrical portions 32 and 34.

Prongs 72 and 74 on the bottom of end members 16 and 18, respectively, extends downwardly from the lower body portions 64 and 66, respectively. When completely assembled in a rigid manner, as described hereinafter, the prongs 72 and 74 serve as legs when the assembly is installed on a slab or shelf or similar means, or when a pipe support is used for the assembly.

Apertures 76 and 78 extend through the lower body portions 64 and 68, respectively. Spacer member 20 having an outside diameter 80 is slidably and removably inserted into both apertures 76 and 78 for the final assembly. The assembly is made rigid and fixed in position by two set screws 86 which pass through two bosses 84 (as shown in FIG. 3) and tighten against the spacer member 20 when all the components are in line around the meter 22. It is to be noted that the two bosses 84 are on both lower body portions 64 and 68 each has two set screws as described.

Thus, the two end members 16 and 18 and the spacer member 20 are a rigidly fixed unit, but removably disassembled. When fixed in such a rigid assembled configuration around the adapter means 12 and 14, assembled to the meter 22 as hereinbefore described, the total structure holding the meter serves as the universal support for the meter.

In addition to the universal support for a meter 10 being installed by resting on a slab, a shelf, or on pipe supports when connected into a supply line and a distribution line, not shown, the universal support for a meter 10 can also be installed on a bracket, or a pair of brackets, such as a wall bracket.

Such brackets, when affixed to a wall can extend outwardly from the wall so that the spacer member 20 can be rested upon it, or the wall bracket can have a special outboard end (not shown) that fits around the spacer member 20. Such a special bracket can have an open "U" type end in which the spacer member 20 rests or an enclosed end that the spacer member would pass through before final assembly or a split end for clamping around the spacer member 20.

Figure 4:
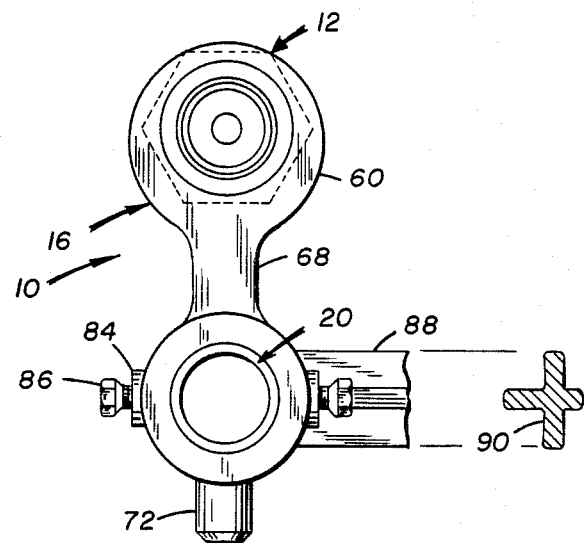
FIG. 4 is an end view of two universal supports for meters side by side, coupled together.

In FIG. 4 a variation is shown which is used when two meters 22 are to be installed side by side in a dual setting arrangement. To affix the two meters in position next to each other a spacer bar 88, with a typical cross section 90, may be used for connecting at each end of the spacer bar 88 to the two spacer members 20 (one spacer member in each universal support for meters 10 in the dual arrangement).

It is to be understood that the cross section 90 of spacer bar 88 is a typical cross section and that other geometrical configurations of the cross section 90 is within the scope and intent of this invention.

The materials for the components of this invention may be any suitable material, preferably metals. The preferred materials are brass for the adapter means 12 and 14, coated cast iron for the end members 16 and 18, and the spacer bar 88, and galvanized pipe for the spacer member 20. The galvanized pipe may be cut from ordinary pipe stock. The length of spacer member 20 is flexible so that a suitable length may be used for each size meter 22 or long enough to fit a range of lengths of meters 22.

It is to be understood that it is within the scope and intent of this invention to make the spacer member 20 with an inside diameter 82 from suitable tubing or a solid bar instead of pipe as shown.

The set screws 86 are preferably stainless steel with cup points, but it is to be understood that set screws of other materials or shapes are within the scope and intent of this invention.

As can be readily understood from the foregoing description of the invention, the present structure can be configured in different modes to provide the ability to support a meter.

Accordingly, modifications and variations to which the invention is susceptible may be practiced without departing from the scope and intent of the appended claims.

What is claimed is:

1. A support system for an object, comprising:
a pair of adapter means, geometrical shaped means on the inner sides of each of said adapter means for being removably affixed to an object to be supported;
a pair of end members, each said end member consists of a first body portion, a second body portion, and a third body portion, said second body portion affixing said first body portion to said third body portion, said first and third body portions each having an aperture therethrough, said aperture through said first body portion having a countersunk portion on one side thereof, each said adapter means having a first portion, a second portion, and a third portion, said second portion being between said first and third portions, said first, second and third portions being configured along a common centerline therethrough and passing through the aperture in the first body portion in its respective end member, said second portion being configured into a cylindrical section and said third portion being configured into a truncated shaped section and adjacent to said second portion and being slidably and removably inserted into said countersunk aperture in the first body portion of its respective end member, said cylindrical section with said adjacent truncated shaped section nesting into said countersunk aperture and said geometrical shaped means interfacing with said truncated shaped section, whereby one of said pair of end members is slidably and removably affixed to one of said pair of adapter means, and the other end member of said pair of end members is slidably and removably affixed to the other adapter means of said pair of adapter means;
a spacer member, said spacer member being slidably and removably affixed to each of the third body portions of said pair of end members; and
a plurality of fastening means, a first portion of said plurality of fastening means threadably and removably rigidly affixing one of said pair of end members to said spacer member, and a second portion of said plurality of fastening means threadably and removably rigidly affixing the other end member of said pair of end members to said spacer member.

2. A support system for an object as recited in claim 1, wherein said object is a meter.

3. A support system for an object as recited in claim 1, wherein said meter is a water meter.

4. A support system for an object as recited in claim 1, wherein each said geometrical shaped means has a counterbore therein, said counterbore having an internal thread therein, said interior of said passageway communicating with the interior of said counterbore.

5. A support system as recited in claim 1, wherein said spacer member is cylindrical and rod-like in configuration, said spacer member having a length, said cylindrical spacer member being positioned into said apertures in said third body portions, said length of said spacer member being such so that positioning of said end members thereon has a flexibility so as to cause said support system to be adjustable to a range of lengths of said object.

6. A support system as recited in claim 1, wherein said spacer member is a pipe.

7. A support system as recited in claim 1, wherein said plurality of fastening means are set screws.

8. A support system as recited in claim 1, and additionally a spacer bar, said spacer bar being slidably affixed to said spacer member for use when a second support system is placed side by side with the original support system to support a second object in a dual setting arrangement, said spacer bar being further slidably affixed to a second spacer member of said second support system.

9. A support system for an object as recited in claim 1, wherein each said adapter means is externally threaded on a first cylindrical end thereof, with said geometrical shaped means on the inner sides of said adapter means being of hexogonal shape.

* * * * *